United States Patent
Kim et al.

(10) Patent No.: US 7,706,347 B2
(45) Date of Patent: Apr. 27, 2010

(54) SIGNAL PROCESSING APPARATUS AND METHOD USING MULTI-OUTPUT MOBILE COMMUNICATION SYSTEM

(75) Inventors: Bong Hoe Kim, Ansan-si (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 1017 days.

(21) Appl. No.: 10/985,782

(22) Filed: Nov. 9, 2004

(65) Prior Publication Data
US 2005/0094603 A1  May 5, 2005

(30) Foreign Application Priority Data

| May 15, 2003 | (KR) | 10-2003-0031026 |
| Nov. 10, 2003 | (KR) | 10-2003-0079201 |
| Nov. 12, 2003 | (KR) | 10-2003-0079917 |
| Nov. 14, 2003 | (KR) | 10-2003-0080650 |
| Mar. 18, 2004 | (KR) | 10-2004-0018355 |

(51) Int. Cl.
*H04B 7/216* (2006.01)
*H03C 7/02* (2006.01)
(52) U.S. Cl. ..................... 370/342; 455/101
(58) Field of Classification Search ............ 455/101, 455/102, 258, 103, 450; 370/310, 342, 319, 370/329
See application file for complete search history.

(56) References Cited

U.S. PATENT DOCUMENTS

| 7,103,325 B1* | 9/2006 | Jia et al. | 455/101 |
| 2002/0007475 A1* | 1/2002 | Crozier | 714/758 |
| 2003/0003863 A1 | 1/2003 | Thielecke | |
| 2003/0031158 A1 | 2/2003 | Kasturi et al. | |
| 2003/0066004 A1 | 4/2003 | Rudrapatna | |
| 2003/0123409 A1 | 7/2003 | Kwak et al. | |
| 2003/0131303 A1* | 7/2003 | Kim et al. | 714/755 |
| 2004/0014447 A1* | 1/2004 | Hepler et al. | 455/258 |

FOREIGN PATENT DOCUMENTS

| CN | 1275873 | 12/2000 |
| EP | 1 298 829 A1 | 4/2003 |
| JP | 2003124915 | 4/2003 |
| KR | 10-0317518 | 12/2001 |
| RU | 2157596 | 10/2000 |

(Continued)

OTHER PUBLICATIONS

Zheng, H. el al. "Multiple ARQ Processes for MIMO Systems."

(Continued)

*Primary Examiner*—Nick Corsaro
*Assistant Examiner*—Michael Faragalla
(74) *Attorney, Agent, or Firm*—Lee, Hong, Degerman, Kang & Waimey (57) ABSTRACT

The present invention provides a signal processing in applying HARQ to an MIMO system, by which error-detecting information enabling to decide whether a received signal is erroneous is appended for transmission. The present invention appends CRC to the data block transported from a higher layer so that HARQ can be efficiently applied to the MIMO system. The present invention segments the CRC-appended data block and then transmits the segmented data blocks via a plurality of antennas. Data streams generated from the segmented data blocks are independent from each other in coding scheme and modulation.

14 Claims, 9 Drawing Sheets

FOREIGN PATENT DOCUMENTS

WO     WO 02/091657 A1     11/2002
WO     WO 03/085875     10/2003

OTHER PUBLICATIONS

Lucent Technologies: "Increasing MIMO throughput with per-antenna rate control" 3GPP TSG RAN WG1 Meeting #21, TSG-R1(01)0879, [onlin] Aug. 31, 2001 [retrieved on Apr. 11, 2005]. Retrieved from the Internet: <URL: http://www.3gpp.org/ftp/tsg_ran/wg1_rl1/tsgr1_21/Docs/Zips/R1-01-0879.zip>.

Keiji Tachikawa, "W-CDMA Mobile Communication Scheme," Jun. 25, 2001, pp. 115-118, Japan.

* cited by examiner

FIG. 1
Related Art

FIG. 2A transport block

SIGNAL PROCESSING APPARATUS AND METHOD USING MULTI-OUTPUT MOBILE COMMUNICATION SYSTEM

CROSS-REFERENCE TO RELATED APPLICATIONS

This application claims the benefit of the Korean Application No. P2003-031026, P2003-079201, P2003-079917, P2003-080650, P2004-018355 filed on May 15, 2003, Nov. 10, 2003, Nov. 12, 2003, Nov. 14, 2003 and Mar. 18, 2004, and PCT Application No. PCT/KR04/1145 filed on May 14, 2004 (claiming priority from P2003-031026), which are hereby incorporated by reference.

This application also claims the benefit of co-pending U.S. application Ser. No. 10/845,086, filed on May 14, 2004.

BACKGROUND OF THE INVENTION

1. Field of the Invention

The present invention relates to mobile communication system, and in particular, to a signal processing apparatus for segmenting data blocks appended with error checking information in a multi-input multi-output (MIMO) system for transmitting/receiving using a plurality of antennas.

2. Discussion of the Related Art

HARQ (Hybrid Automatic Request), which is applicable to the V-BLAST (Vertical Bell Laboratories Layered Space Time) system as one of the MIMO (multi-input multi-output) systems and the HSDPA (high speed downlink packet access) system, according to a related art is explained as follows.

Figure 1:
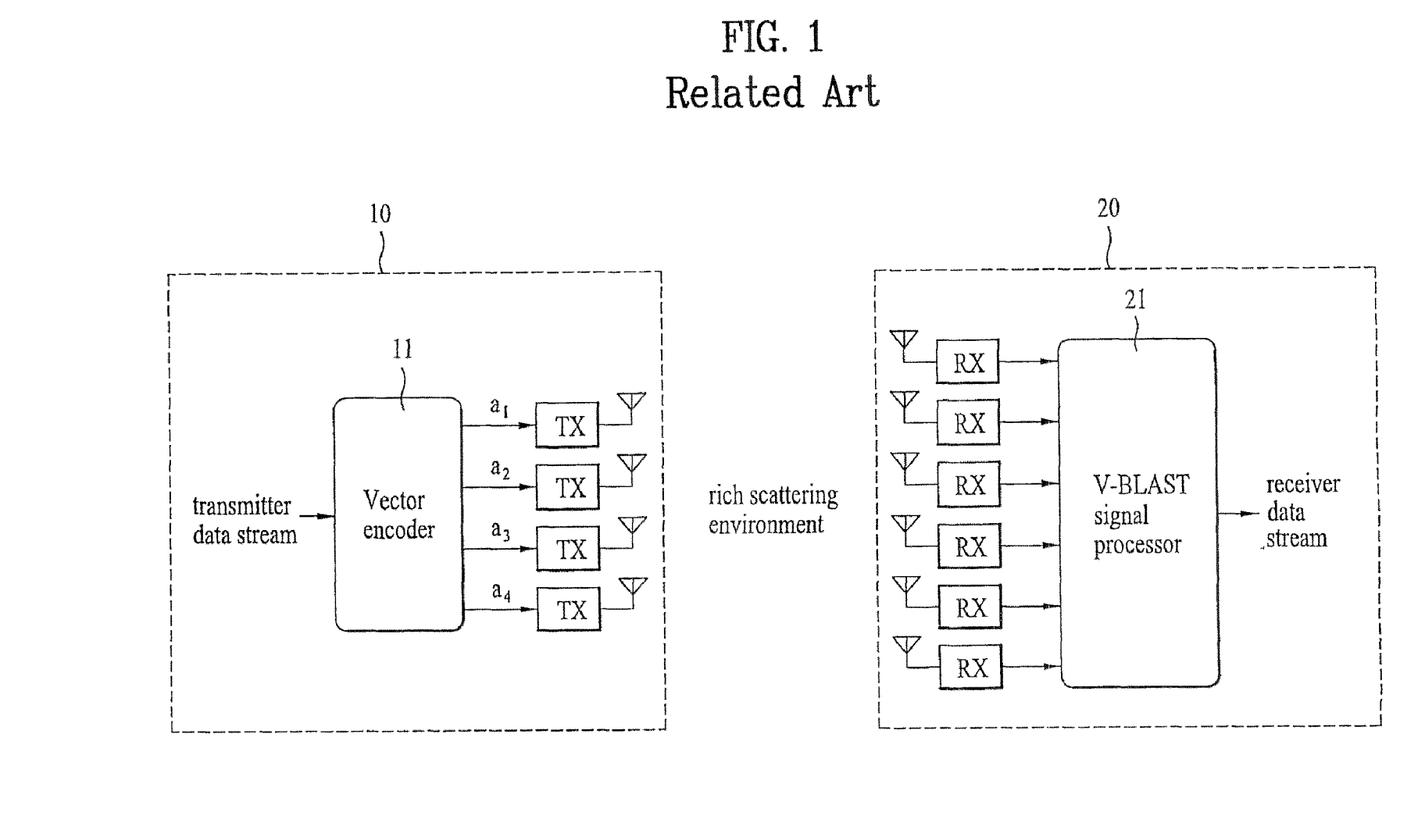
FIG. 1 is a block diagram of the V-BLAST system incorporating the present invention.

FIG. 1 is a block diagram of the V-BLAST system utilizing the MIMO antenna processing. Referring to FIG. 1, transport data 11 is inputted to a vector encoder 12 in a transmitting side. The vector encoder 12 is provided with a serial-to-parallel circuit for transferring the transport data in parallel via N-antennas 13. A modulation system and a channelization code number of the data transferred via the N-antennas 13 can be setup differently. Such a code having orthogonality as OVSF (orthogonal variable spreading factor) code is used as the channelization code.

When performing the channelization coding using the code having the orthogonality, a separate signal processing or space-time code is not used in spite of using a plurality of the transmitting antennas 13. Namely, the inputted data are independently transmitted via a plurality of the antennas.

When transmitting a signal via the N-antennas, the modulation scheme and the channelization code number can be differentiated for each antenna. Namely, if a transmitting end is provided with the information for a channel status transmitted via each antenna, QAM (quadrature amplitude modulation) is used for the antenna having a good channel status and more multi-codes are allocated to transmissions. On the other hand, QPSK (quadrature phase shift keying) is used for the antenna in poor channel status and less multi-codes are allocated to the transmissions.

In the transmitting end, such as a base station, each signal differing in the modulation scheme and multi-code number is independently transmitted via each antenna and a separate signal processing using interoperability between antennas is not carried out for transmission quality enhancement. Thus, the transmitting end uses a plurality of the antennas 13 and the respective antennas transmit signals independently. Meanwhile, a receiving end receives signals using a plurality of receiving antennas 14 that receive the signals transmitted from a plurality of the transmitting antennas, respectively. A V-BLAST signal processing unit 15 of the receiving end detects the signals that are independently transmitted via the respective transmitting antennas to be received via the respective receiving antennas 14.

In the receiving end, such as a mobile terminal, in order to detect the signal transmitted from a specific one of the transmitting antennas, other signals transmitted from other transmitting antenna are regarded as interference signals. A weight vector of a receiving array antenna is computed for each signal transmitted from the corresponding one of the transmitting antennas and the influence for the previously detected signal in the receiving end is removed. Meanwhile, a method of detecting the signals transmitted from the respective transmitting antennas in order of a size of a signal to interference noise ratio can be used as well.

The V-BLAST is disclosed in P. W. Wolniansky, G. J. Foschini, G. D. Golden and R. A. Valenzuela, "V-BLAST: An Architecture for Realizing Very High Data Rates Over the Rich-Scattering Wireless Channel", IEE Electronics Letters, vol. 35, no. 1, pp. 14~16, January, 1999.

In the HSDPA system, AMC (Adaptive Modulation and Coding) and HARQ are adopted for downlink high data rate packet transmission. In AMC, data can be transferred at an optimal data rate according to a current channel status in a manner of changing modulation or coding rate variably in accordance with a channel status.

HARQ combines channel coding and ARQ (automatic repeat request). The ARQ checks a presence or non-presence of error of a transferred packet in a receiving end and feeds back the corresponding result to a transmitting end, whereby the packet having the packet transmission error is retransmitted. In case of feeding back the presence or non-presence of the packet transmission error to the transmitting end, ACK (acknowledgement) for reception success or NACK (negative acknowledgment) for reception failure is transmitted. Even if there exists an error in the already received packet, HARQ does not discard the erroneous packet but combines it with the retransmitted packet to decode. Hence, HARQ increases a diversity or coding gain.

In case of applying HARQ to the V-BLAST system, an error check method for deciding the transmission success or failure is needed.

However, the related art method fails to propose how the error check bit is appended to the data block, how the data block is segmented to be transmitted via the respective antennas. Hence, HARQ is not applicable to the V-BLAST system.

SUMMARY OF THE INVENTION

Accordingly, the present invention is directed to a signal processing method in a multi-input multi-output (MIMO) system that substantially obviates one or more problems due to limitations and disadvantages of the related art.

An object of the present invention is to provide a signal processing in applying HARQ to an MIMO system, by which error detecting information enabling to decide whether a received signal is erroneous is appended for transmission.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a communication system having a plurality of antennas, the communication system transmitting signals in a manner of applying separate weights to the signals transmitted via the antennas, respectively, a transmission signal processing method according to the present invention includes the steps of appending an information for an error detection to one data block and generating at least two data streams from the error detection information appended data block.

According to one embodiment of the invention, a signal processing method in a mobile communication system utilizing a plurality of data streams capable of being transmitted using a multiple-output antenna, comprises: selecting a modulation scheme (for example, QPSK or 16 QAM) and a number of multicodes (for example, Walsh codes used for the CDMA system) for each data stream, wherein each data stream is capable of processing a predetermined data rate; generating channel coded data from a transport block data appended with error correction bits; performing spatial segmentation on the channel coded data to provide corresponding segmented data block to the plurality of data streams, wherein the channel coded data comprises the transport block data and the error correction bits (for example, CRC bits) and tail bits, and a size of the segmented data block corresponds to a code rate of a channel coder; and generating rate matched data for each one of the plurality of data streams.

According to one aspect of the invention, the size of the segmented data block is proportionally determined based on a data rate capacity of each data stream. Preferably, the size of the segmented data block is a multiple of a number of output bits associated with the code rate. For example, when the code rate is ⅓, the size of the segmented data block is a multiple of 3.

According to another aspect of the invention, a plurality of code rates may be concurrently used for the plurality of data streams. In other words, two data streams may be concurrently using different code rates.

According to another embodiment of the present invention, a signal processing method comprises: selecting a modulation scheme and a number of multicodes for each data stream, wherein each data stream is capable of processing a predetermined data rate; generating channel coded data from a transport block data; rate matching the channel coded data to generate rate matched data, wherein a data block size for rate matching is associated with a code rate of a channel coder, error correction bits and tail bits; and performing spatial segmentation on the channel coded and rate matched data to provide corresponding segmented data block to a plurality of data streams, wherein the channel coded and rate matched data comprises at least the transport block data and error correction data, (for example, CRC bits) and tail bits.

According to one aspect of the invention, the step of rate matching comprises one of puncturing output bits and repeating output bits. In addition, the same code rate is preferably used for the plurality of data streams.

According to another embodiment of the present invention, a signal processing method comprises: selecting a modulation scheme and a number of multicodes for each data stream used for processing a transport data block, wherein each data stream is capable of processing a predetermined data rate; performing spatial segmentation on the transport data block to provide corresponding segmented data block to the plurality of data streams, wherein input data of the spatial segmentation comprises the transport block data and error correction data; generating channel coded data from the segmented data block for each one of the plurality of data streams; and generating rate matched data from the channel coded data for each one of the plurality of data streams.

According to one aspect of the invention, a bit scrambling may be performed before or after performing the spatial segmentation.

According to yet another embodiment of the present invention, a signal processing method comprises: receiving a transport block data; appending error correction bits to the transport block data; generating channel coded data from a transport block data appended with the error correction bits; performing spatial segmentation on the channel coded data to provide corresponding segmented data block to the plurality of data streams; generating rate matched data for each one of the plurality of data streams; and transmitting each one of the plurality of data stream to a receiving system using multiple-output antennas.

According to another embodiment of the present invention, the processes described above may be implemented in a vector encoder operatively connected to a plurality of transmission modules which is operatively connected to a plurality of antennas. Preferably, each one of the plurality of antennas is associated with transmitting at least one of the plurality of data streams. The vector encoder comprises a signal processor for performing the above described processes.

Accordingly, the present invention appends the error check information to the data block to be transmitted, segments the information-appended data block, and then transmits the segmented data blocks. Hence, the present invention enables to efficiently apply HARQ to the MIMO system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The various embodiments described herein are preferably implemented in a physical layer of a transmitting system, such as a base station or a mobile terminal. The physical layer provides information transfer service to a higher layer and is linked via transport channels to a medium access control layer.

Figure 2A:
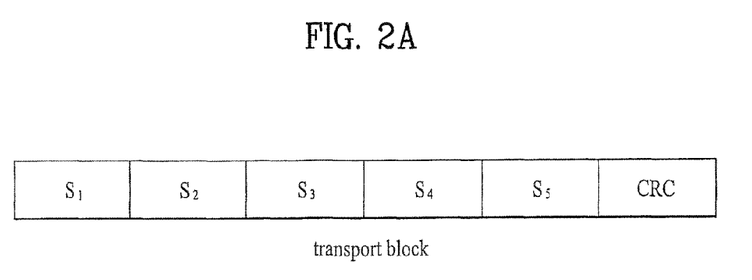
FIG. 2 is a process flowchart for generating a plurality of data streams from a data block transported from a higher layer according to a first embodiment of the present invention.
Figure 2B:
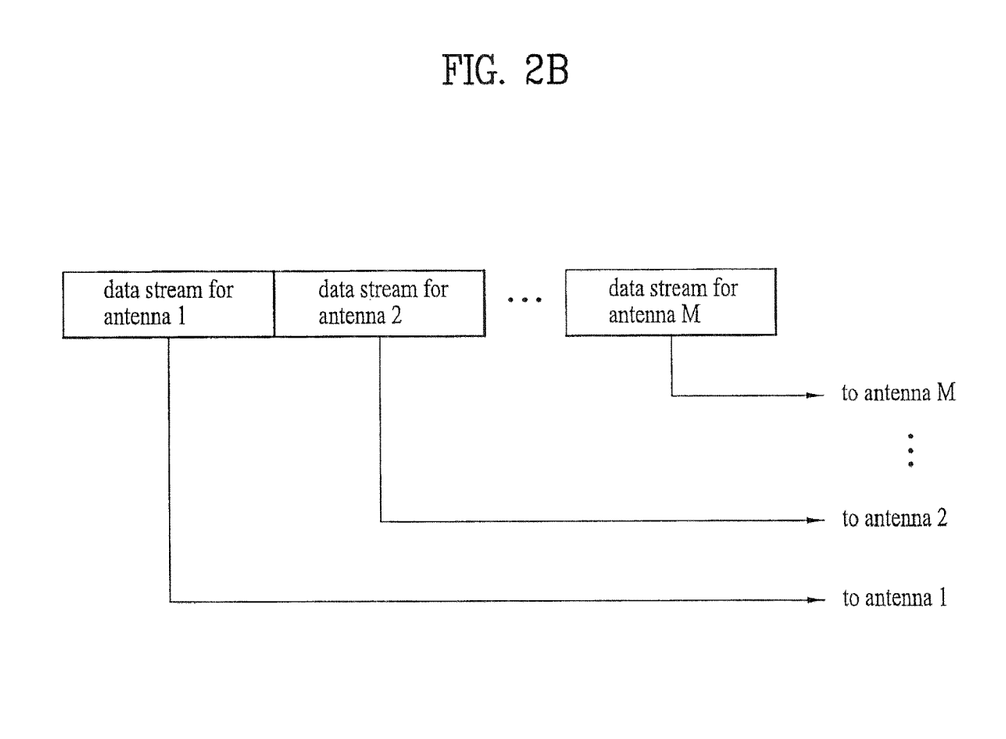

FIG. 2 is a process flowchart for generating a plurality of data streams from a data block transported according to a first embodiment of the present invention. In this embodiment, it is assumed that only one transport block is being processed per TTI (Transmission Time Interval). In FIG. 2, the spatial segmentation and the channel coding are performed before rate matching. A spatial segmentation is required to segment an input block into multiple blocks for simultaneous transmission of multiple data streams.

Referring to FIG. 2, a data block delivered from a higher layer of the transmitting system is appended with error check information to be used in a receiving system (S31). Preferably, CRC (cyclic redundancy check) can be used as the error check information. Preferably, the higher layer selects the modulation scheme, such as QPSK or 16 QAM, and the number of multicodes, such as the Walsh codes in the CDMA system, of each stream. In addition, higher layer informs physical layer of the number of inputs bits to each rate matching block.

Bit scrambling (S32), code block segmentation (S33), and channel coding (S34) are carried out on the CRC-bit appended data block. In order to generate independent data streams amounting to 'N' from the channel-coded data block, segmentation is performed on the data block (S35). The segmentation of the data block is carried out in a manner of segmenting one data block according to a regular rule spatially, which will be called 'spatial segmentation' in the following.

After completion of the spatial segmentation (S35), rate matching is independently carried out on each of the segmented data blocks (S36). Preferably, in order to provide different modulation and coding scheme for each data stream (for example, stream 1 to stream N), the rate matching is performed for each data stream. If the rate matching (S36) is independently performed on each of the segmented data blocks, the segmented data blocks can be provided with different code rates, respectively. The coding rate is generally represented as r=k/n, wherein k is input bit sequence and n is number of output bit.

A plurality of data streams are formed via physical channel segmentation (S37) performed on the rate-matched data blocks, respectively. Interleaving is then carried out on the respective streams (S38). When performing 16 QAM, the constellation rearrangement is carried out (S39). Alternatively, when performing QPSK, the constellation rearrangement is unnecessary, and thus such step may be bypassed. Each data stream is mapped to physical channels (S40).

Figure 3:
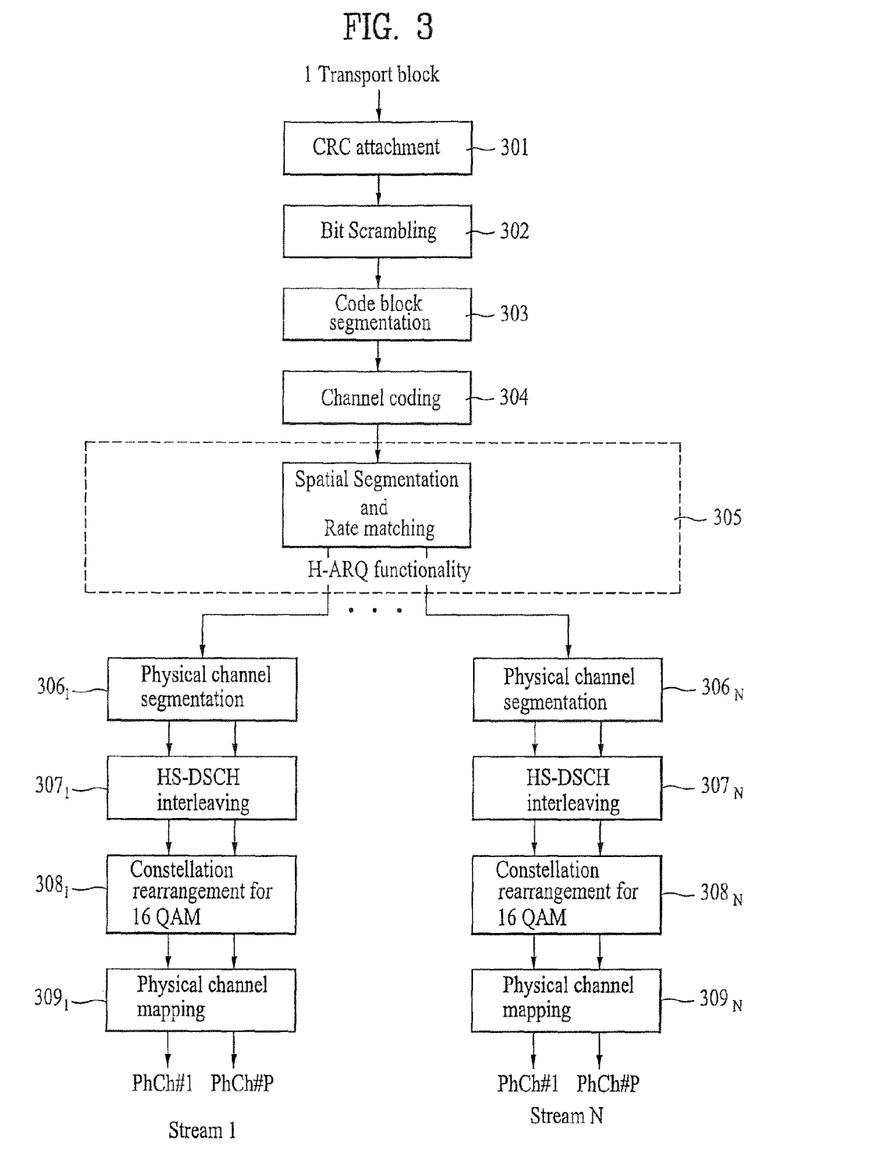
FIG. 3 is a process flowchart for generating a plurality of data streams from a data block transported from a higher layer according to a second embodiment of the present invention.

FIG. 3 is a process flowchart for generating a plurality of data streams from a data block transported from a higher layer according to a second embodiment of the present invention. In FIG. 3, the spatial segmentation is preferably performed after the channel coding and the rate matching.

In the second embodiment, the number of bits transmitted in physical channel during a TTI is dependent on the modulation scheme and the number of multicodes of each stream. A rate matched data block is to be segmented in proportion to the ratio of the number of bits per stream. Since a transport block goes through one rate matching block, the code rates of all streams are the same. In other words, the modulation scheme and the number of multicodes can be separately controlled per stream but code rate cannot be separately controlled per stream.

Referring to FIG. 3, a data block delivered from an upper layer of the system is appended with error check information in a receiving end in step S41. Preferably, CRC (cyclic redundancy check) can be used as the error check information.

Bit scrambling (S42), code block segmentation (S43), and channel coding (S44) are carried out on the CRC-bit appended data block. The rate matching (S45) is carried out on data blocks. Then spatial segmentation (S46) is carried out on the data block to generate independent data streams amounting to 'N' from the channel-coded and rate matched data block. Because the spatial segmentation is performed after completing the rate matching on one data block, each of the data streams can be provided with the same modulation and coding scheme.

A plurality of data streams (that are rate matched) are then subjected to physical channel segmentation (S47). Interleaving is then carried out on the respective streams (S48). When performing 16 QAM, the constellation rearrangement is carried out (S29). Alternatively, when performing QPSK, the constellation rearrangement is unnecessary, and thus such step may be bypassed. Each data stream is mapped to physical channels (S30).

Figure 4A:
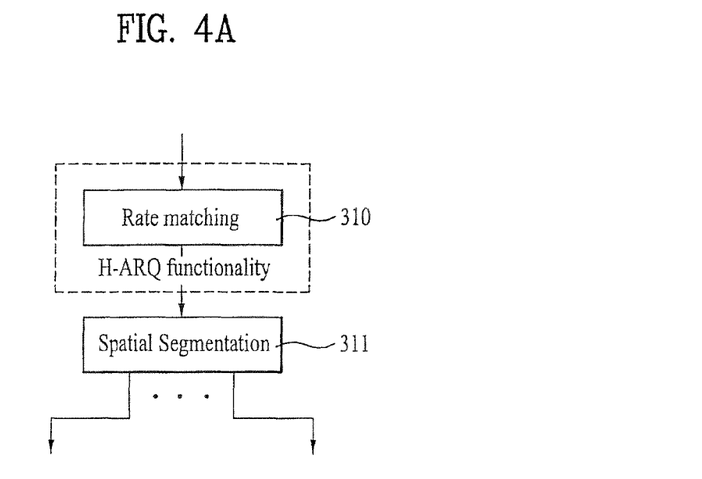
FIG. 4 is a process flowchart for generating a plurality of data streams from a data block transported from a higher layer according to a third embodiment of the present invention.
Figure 4B:
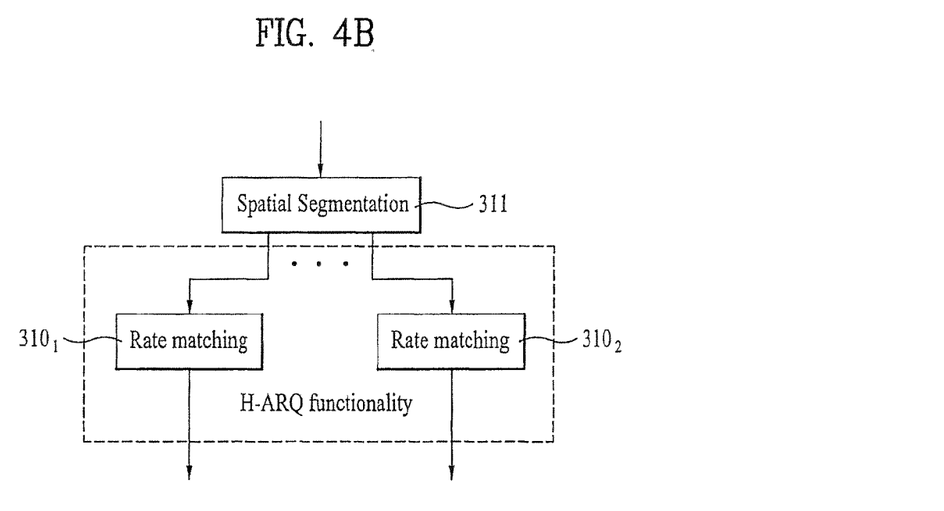

FIG. 4 is a process flowchart for generating a plurality of data streams from a data block transported from a higher layer according to a third embodiment of the present invention. In FIG. 4, the channel coding and the rate matching for each data stream are preferably performed after the spatial segmentation.

Referring to FIG. 4, once a data block is delivered from a higher layer, error check information in a receiving end is appended to the data block (S61). CRC (cyclic redundancy check) can be used as the information for the error check.

The bit scrambling (S62) and the spatial segmentation (S63) are carried out on the CRC-bit appended data block, in turn. The spatial segmentation (S63) generates independent data streams amounting to 'N' from one data block delivered from the higher layer. After completion of spatial segmentation (S63), code block segmentation (S64) and channel coding (S65) are carried out on the respective segmented data streams.

After rate matching (S66) has been performed on the channel-coded data block, the physical channel segmentation (S67) is performed on the rate-matched data blocks. Thereafter, data interleaving is carried out on the respective streams (S68). When performing 16 QAM, constellation rearrangement is carried out (S69). Alternatively, when using QPSK, constellation rearrangement is unnecessary. The streams are mapped to physical channels, respectively (S60).

Figure 5:
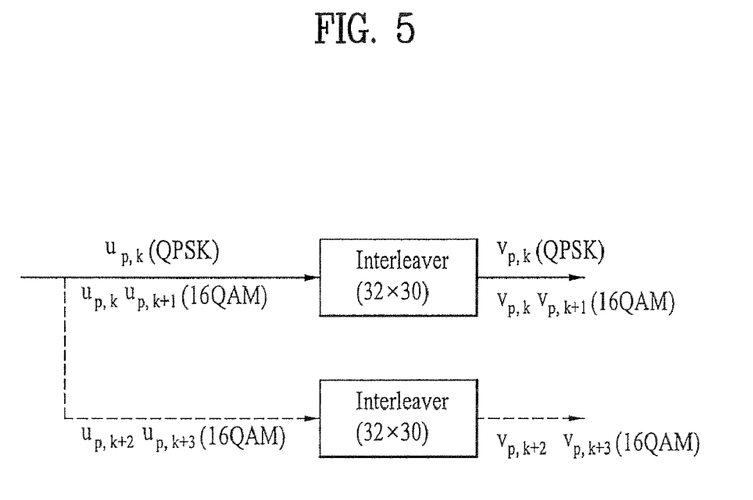
FIG. 5 is a process flowchart for generating a plurality of data streams from a data block transported from a higher layer according to a fourth embodiment of the present invention.

FIG. 5 is a process flowchart for generating a plurality of data streams from a data block transported from a higher layer according to a fourth embodiment of the present invention. The embodiment illustrated in FIG. 5 similar to the embodiment illustrated in FIG. 4 except that the bit scrambling is performed after the spatial segmentation.

Referring to FIG. 5, once a data block is delivered from a higher layer, error check information in a receiving end is appended to the data block (S81). CRC (cyclic redundancy check) can be used as the information for the error check.

The spatial segmentation (S82) are carried out on the CRC-bit appended data block. The spatial segmentation (S82) generates independent data streams amounting to 'N' from one data block delivered from the higher layer. After completion of spatial segmentation (S82), the bit scrambling (S83), code block segmentation (S84) and channel coding (S85) are carried out on the respective segmented data streams.

After rate matching (S86) has been performed on the channel-coded data block, the physical channel segmentation (S87) is performed on the rate-matched data blocks. Thereafter, data interleaving is carried out on the respective streams (S88). When performing 16 QAM, constellation rearrangement is carried out (S89). Alternatively, when using QPSK, constellation rearrangement is unnecessary. The streams are mapped to physical channels, respectively (S90).

Figure 6:
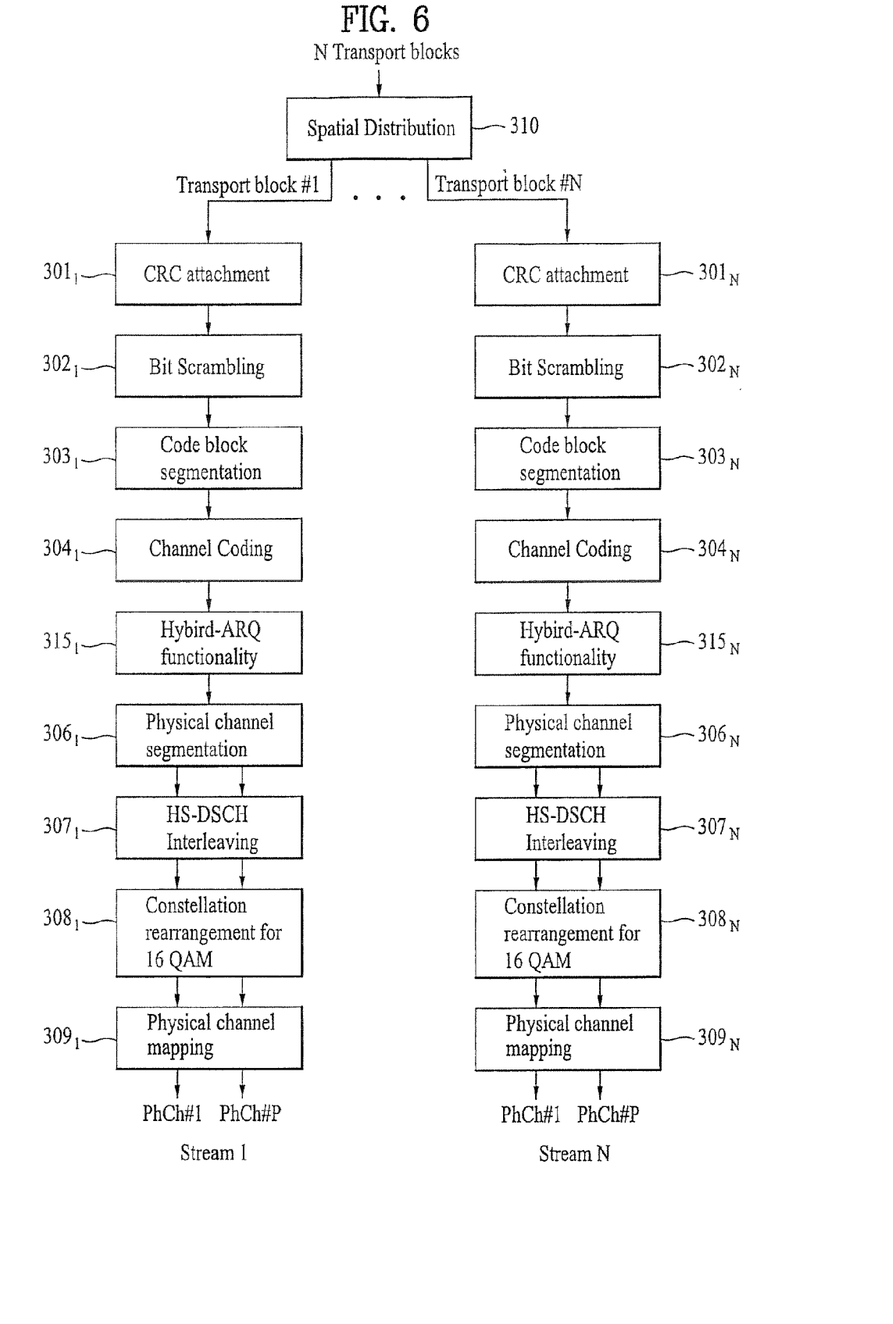
FIG. 6 is a diagram of a process of performing spatial segmentation according to the preferred embodiment of the present invention.
Figure 7:
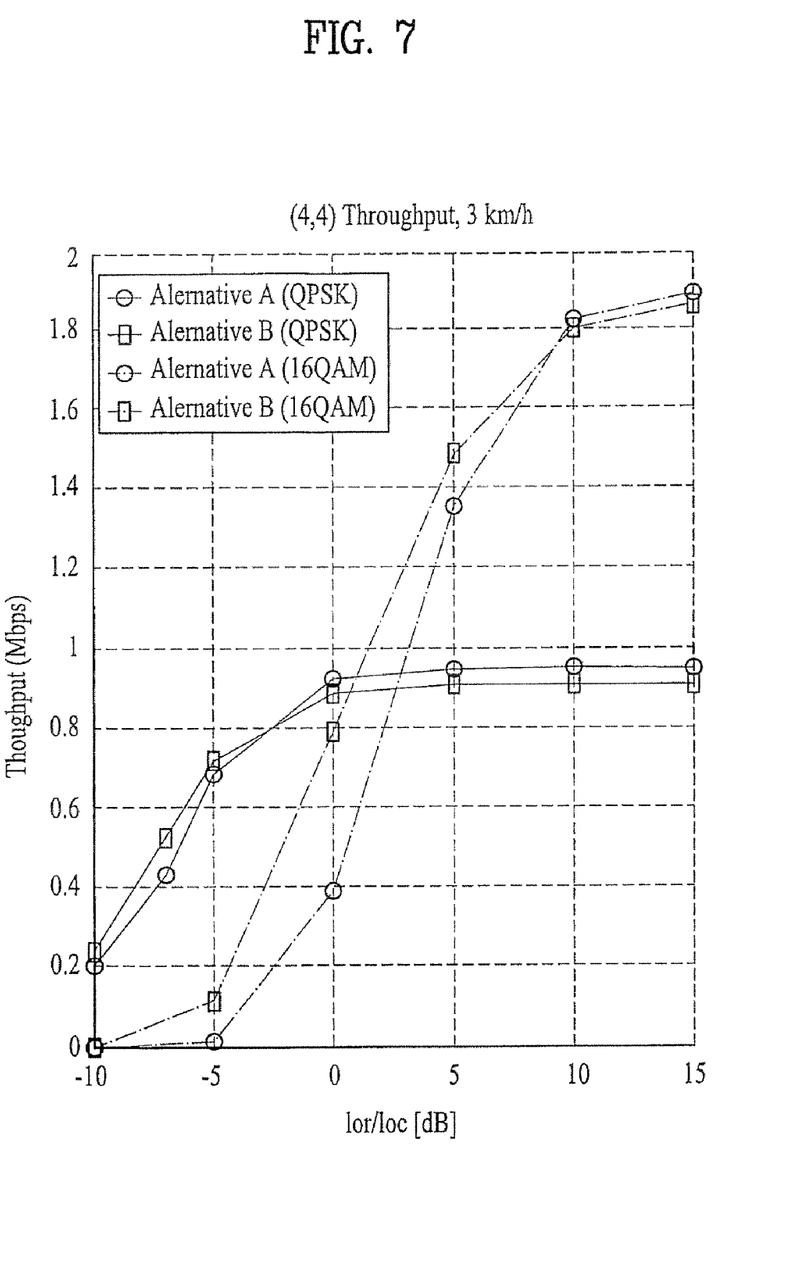
Figure 8:
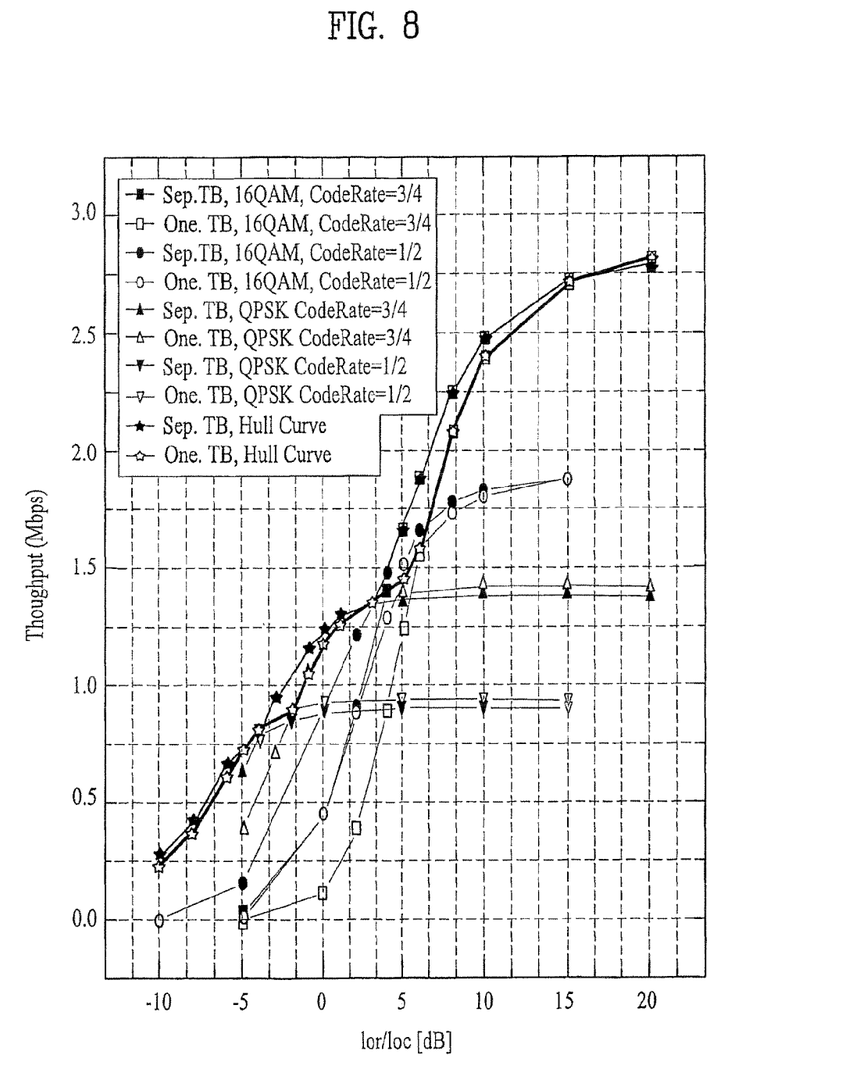

FIG. 6 is a diagram illustrating the spatial segmentation of data block according to the preferred embodiment of the present invention. FIG. 6 shows one of multiple data streams being transmitted via one antenna. Alternatively, a plurality of multiplexed streams can be transmitted via one antenna.

Referring to FIG. 6, an error check bit 92 is appended to one data block 91 transferred from a higher layer. Assuming that a data block having a size of 'N' is delivered from a higher layer, CRC having a 24-bits length is appended to the data block. If channel coding having a ⅓ coding rate is performed thereon, a size of the data block becomes $N_d$-bits. A size of $N_d$ can be found by Equation 1. And, '12' in Equation 1 indicates a turbo code tail added in turbo coding. Equation 1 relates to FIG. 2.

$$N_d = 3(N+24)+12 \quad \text{[Equation 1]}$$

If rate matching is performed on the data block, the size $N_d$ of the data block can be found by Equation 2. And, 'Δ' in Equation 2 is a negative value if rate matching requires puncturing (to reduce the excessive bits) or a positive value if rate matching requires repetition (to increase the number of bits). Equation 2 relates to FIG. 3.

$$N_d = 3(N+24)+12+\Delta \quad \text{[Equation 2]}$$

If there are M transmitting antennas, the modulation and multi-coding number can be expressed by $(m_j,c_j)$ (j=1, 2, ..., M). In this case, $m_j$ indicates a modulation scheme of a $j^{th}$ antenna. In case of QPSK, it is determined $m_j=1$. In case of 16 QAM, it is determined $m_j=2$. Meanwhile, $c_j$ indicates the number of multi-codes used in sending data transmitted via the $j^{th}$ antenna.

Preferably, the number of multi-codes can be converted into a coding rate. Namely, in HSDPA, SF (spreading factor) is 16 and QPSK or 16 QAM is used. Hence, data transmittable via one HS-DSCH sub-frame are 960-bits or 1,920-bits. The number of data bits substantially transmitted is found by multiplying the data bits transmitted via the HS-DSCH sub-frame by the multi-code number $c_j$. Hence, the coding rate becomes N/(960*c) in case of QPSK or N/(1920*c) in case of 16 QAM.

Thus, in case of performing spatial segmentation on one CRC-appended data block 91 into the respective data streams, a ratio of a data amount allotted to a specific data stream among total data transport amount should be taken into consideration. Namely, the data block should be segmented to correspond to the modulation and multi-code number applied to each of the streams. Equation 3 determines a size of the segmented data block in segmenting the data block 91 into the respective data streams.

$$N_{data,j} = \left\lfloor N_d \frac{m_j c_j}{\sum_{j=1}^{M} m_j c_j} \right\rfloor, j=1, \ldots, M \quad \text{[Equation 3]}$$

In Equation 3, 'j' indicates an index for each of the segmented data streams and $N_{data,j}$ indicates a size of a $j^{th}$ data stream. $N_{data,j}$ is computed using a ratio of a data transport rate $(m_j c_j)$ allotted to the $j^{th}$ stream among the total data transport rate $$\left( \sum_{j=1}^{M} m_j c_j \right)$$

in the size $N_d$ of the data block before segmentation. Meanwhile, since each of the streams consists of bits of a positive number, a '⌊ ⌋' operation is executed.

In case of turbo coding having a ⅓ coding rate, the size of the data block inputted for rate matching becomes a multiple of '3'. Hence, if the $N_{data,j}$ value computed by Equation 2 fails to be the multiple of '3', the size of the $j^{th}$ data stream can be determined as a multiple of '3' not exceeding $N_{data,j}$. For instance, if the $N_{data,j}$ value computed by Equation 2 is 14, the size of the $j^{th}$ data stream can be determined as 12.

By the '⌊ ⌋' operation or an operation for making $N_{data,j}$ a multiple of "3", it may occur $$\sum_{j=1}^{M} N_{data,j} \neq N_d.$$

Hence, it is necessary to distribute bits amounting to $$N_d - \sum_{j=1}^{M} N_{data,j}$$

(remaining bits) to the respective streams. In doing so, the remaining bits can be distributed to each stream one by one until there exists no more bit to be distributed. Alternatively, the remaining bits can be distributed to the respective data streams by 3-bits each.

The above scheme may be explained the best by an example referring to FIG. 2. Assume that the size $N_d$ of the data block is 30 bits and the coding rate is ⅓. The 30-bit data block is subjected to the spatial segmentation (S35). Let's assume that there are 3 data streams, wherein Stream 1 can process 10 bits, Stream 2 can process 5 bits, and Stream 3 can process 25 bits. Hence the total number of bits that can be processed by Stream 1, Stream 2, and Stream 3 are 40 bits (10+5+25). The spatial segmentation module then determines and segments the 30-bits into these three streams, wherein the input to each respective stream has to be a multiple of 3 (because the coding rate is ⅓).

For Stream 1, the spatial segmentation module determines $N_{data,1}$ to be 6 bits: (10 bits×30 input bits)/(40 total stream bits)=7.5; and thus the next lower bit that is a multiple of 3 is "6".

For Stream 2, the spatial segmentation module determines $N_{data,2}$ to be 3 bits: (5 bits×30 input bits)/(40 total stream bits)=3.8; and thus the next lower bit that is a multiple of 3 is "3".

For Stream 3, the spatial segmentation module determines $N_{data,3}$ to be 18 bits: (25 bits×30 input bits)/(40 total stream bits)=18.8; and thus the next lower bit that is a multiple of 3 is "18".

As a result, the total number of bits are:

[6 bits (for Stream 1)+3 bits (for Stream 2)+18 bits (for Stream 3)]=27 bits.

The remaining bits are 3 bits (difference between $N_d$ and 27 bits). And the remaining bits must be assigned to one of the data streams by the spatial segmentation module (S35). Preferably, the remaining 3 bits are assigned to Stream 1, thus allowing Stream 1 to process a total of 9 bits, which is still a multiple of 3.

An operation of the receiving end of the present invention is explained as follows. First of all, reception data are passed through the following steps so that signals transmitted from the transmitting end via the respective antennas are detected. When the signal transmitted via a specific transmitting antenna is detected in the receiving end, other signals transmitted via other transmitting antennas are regarded as interference signals. Namely, a weight vector of a receiving array antenna is computed for each signal transmitted from the corresponding one of the transmitting antennas and the influence for the previously detected signal in the receiving end is removed. Meanwhile, a method of detecting the signals transmitted from the respective transmitting antennas in the order of a signal strength to interference noise ratio can be used as well.

The signals detected for the transmitting antennas in the above-explained manner are deplexed to be separated into the data streams, respectively. The data streams are passed through the parallel-to-serial circuit to be united into one data block and are then decoded.

In the transmitting end, one information (CRC) for the error check is appended to one data block and the CRC-appended data block is then segmented to be transmitted. Hence, it is able to check whether the received data block is erroneous only after the segmented data blocks have been united into one data block again. For the error check, after decoding has been performed on the data block, whether the received data block is erroneous is decided using the CRC appended to the data block.

In accordance with HARQ algorithm, an acknowledgment (ACK) signal in case of successful reception or a non-acknowledgment (NACK) signal in case of reception failure is fed back to the transmitting end as a result of the error check. If the transmitting end receives the ACK signal a new data block is transmitted. If the transmitting end receives the NACK signal, the same data block previously transmitted is retransmitted to the receiving end.

Accordingly, the present invention appends the error check information to the data block to be transmitted, segments the information-appended data block, and then transmits the segmented data blocks. Hence, the present invention enables to efficiently apply HARQ to the MIMO system.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to one skilled in the art that the preferred embodiments of the present invention can be readily implemented using, for example, a processor or other data or digital processing device, either alone or in combination with external support logic residing in the vector encoder 12 of the transmitting system (FIG. 1).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A signal processing method for transmitting data using a plurality of antennas in a mobile communication system, the method comprising:

receiving transport block data;

appending error correction bits to the transport block data;

generating channel coded data from the transport block data appended with the error correction bits;

performing spatial segmentation on the channel coded data to provide a plurality of spatially segmented data blocks;

independently performing rate matching on each of the plurality of spatially segmented data blocks to generate a plurality of data streams and to provide a plurality of independent modulation schemes, wherein each of the plurality of independent modulation schemes corresponds to one of the plurality of data streams;

independently performing modulation on each of the plurality of data streams by independently applying each of the plurality of independent modulation schemes to each corresponding data stream in the plurality of data streams; and independently performing physical channel mapping for each of the plurality of data streams to be transmitted to a receiving side via each of a plurality of physical channels, wherein the rate matching is performed after the spatial segmentation, and wherein the modulation is performed after the rate matching.

2. The method of claim 1, wherein a size of each of the plurality of segmented data blocks is proportionally determined based on a data rate capacity of each of the plurality of data streams to be transmitted using the plurality of physical channels.

3. The method of claim 2, wherein the size of each of the plurality of segmented data blocks corresponds to a code rate of a channel coder, and wherein the size of each of the plurality of segmented data blocks is a multiple of a number of output bits associated with the code rate.

4. The method of claim 1, wherein a size of each of the plurality of segmented data blocks corresponds to a code rate of a channel coder, and when the code rate is ⅓, the size of each of the plurality of segmented data blocks is a multiple of 3.

5. The method of claim 1, wherein a plurality of code rates are concurrently used for the plurality of data streams to be transmitted using the plurality of physical channels.

6. The method of claim 1, further comprising:
generating physical channel segmentation data for each of the plurality of data streams to be transmitted using the plurality of physical channels.

7. A signal processing method for transmitting data using a plurality of antennas in a mobile communication system, the method comprising:
appending error correction bits to transport block data;
performing spatial segmentation on the transport block data appended with error correction bits to provide a plurality of spatially segmented data blocks;
independently performing channel coding on each of the plurality of spatially segmented data blocks to generate a plurality of channel coded data blocks;
independently performing rate matching on each of the plurality of channel coded data blocks to generate a plurality of data streams and to provide a plurality of independent modulation schemes, wherein each of the plurality of independent modulation schemes corresponds to one of the plurality of data streams;
independently performing modulation on each of the plurality of data streams by independently applying each of the plurality of modulation schemes to each corresponding data stream in the plurality of data streams; and
independently performing physical channel mapping for each of the plurality of data streams to be transmitted to a receiving side via each of a plurality of physical channels,
wherein the rate matching is performed after the spatial segmentation, and wherein the modulation is performed after the rate matching.

8. The method of claim 7, wherein a bit scrambling is performed before performing the spatial segmentation.

9. The method of claim 7, wherein a bit scrambling is performed after performing the spatial segmentation.

10. The method of claim 7, wherein a size of each of the plurality of segmented data blocks is proportionally determined based on a data rate capacity of each of the plurality of data streams to be transmitted using the plurality of physical channels, and wherein the size of each of the plurality of segmented data blocks is a multiple of a code rate of a channel coder.

11. The method of claim 10, wherein the size of each of the plurality of segmented data blocks is a multiple of a number of output bits associated with the code rate.

12. The method of claim 7, wherein a code rate of a channel coder is ⅓ and the size of each of the plurality of segmented data blocks is a multiple of 3.

13. The method of claim 7, wherein a plurality of code rates are concurrently used for the plurality of data streams to be transmitted using the plurality of physical channels.

14. The method of claim 7, further comprising:
generating physical channel segmentation data for each of the plurality of data streams to be transmitted using the plurality of physical channels.

* * * * *